United States Patent [19]

Kamada

[11] Patent Number: 4,894,720
[45] Date of Patent: Jan. 16, 1990

[54] CIRCUIT FOR SELECTIVELY OUTPUTTING HIGH FREQUENCY SIGNALS

[75] Inventor: Shuhei Kamada, Minou, Japan

[73] Assignee: Sanyo Electric Co., Ltd., Moriguchi, Japan

[21] Appl. No.: 225,319

[22] Filed: Jul. 28, 1988

[30] Foreign Application Priority Data

Jul. 31, 1987 [JP] Japan ................... 62-193282
Jul. 31, 1987 [JP] Japan ................ 62-118379[U]

[51] Int. Cl.⁴ .......................................... H04N 5/268
[52] U.S. Cl. .................................. 358/181; 307/112; 307/146; 333/103
[58] Field of Search .................. 358/181, 194.1, 160, 358/186, 188; 307/112, 146, 154; 333/101, 103

[56] References Cited

U.S. PATENT DOCUMENTS

| | | | |
|---|---|---|---|
| 4,097,899 | 6/1978 | Yu | 358/181 |
| 4,542,300 | 9/1985 | Nagatomi | 307/146 X |
| 4,647,973 | 3/1987 | Deiss | 358/181 |
| 4,656,364 | 4/1987 | Yokogawa et al. | 333/103 X |
| 4,678,929 | 7/1987 | Alpaiwalla | 358/181 X |
| 4,742,249 | 5/1988 | Alpaiwalla et al. | 333/103 X |
| 4,745,478 | 5/1988 | Nakagawa et al. | 358/181 |
| 4,768,110 | 8/1988 | Dunlap et al. | 358/181 X |
| 4,802,239 | 1/1989 | Ooto | 333/103 X |
| 4,803,447 | 2/1989 | Schultz et al. | 333/103 |

FOREIGN PATENT DOCUMENTS

| | | |
|---|---|---|
| 57-48737 | 3/1982 | Japan . |
| 58-141637 | 9/1983 | Japan . |
| 61-7134 | 1/1986 | Japan . |
| 61-195125 | 12/1986 | Japan . |

OTHER PUBLICATIONS

Sanyo Technical Review, vol. 15, No. 2, Aug. 1983, UDC 621.372:621.397.23, RF Modulator Unit.

Primary Examiner—James J. Groody
Assistant Examiner—Mark R. Powell
Attorney, Agent, or Firm—Armstrong, Nikaido, Marmelstein, Kubovcik & Murray

[57] ABSTRACT

When first high frequency signals from an antenna input terminal are selected to be outputted, all transistors constituting first and second switch devices are turned off and a RF modulator is also turned off. Therefore, first high frequency signals are transmitted to a TV output terminal through a first transmission line. When second high frequency signals outputted from the RF modulator are selected to be outputted, the RF modulator is turned on and transistors constituting the first and second switch devices are turned on. Consequently, second high frequency signals are transmitted to the TV output terminal through a second transmission line. On this occasion, the transistors constituting the first switch grounds the first transmission line and form a parallel resonance circuit in the first transmission line. Therefore, the passage of the first high frequency signals from the antenna input terminal is cut off and the reverse passage of the second high frequency signals and a harmonics component thereof from the second transmission line is prevented.

15 Claims, 9 Drawing Sheets

CIRCUIT FOR SELECTIVELY OUTPUTTING HIGH FREQUENCY SIGNALS

BACKGROUND OF THE INVENTION

1. Field of the Invention

The present invention relates to a circuit for selectively outputting high frequency signals and, more specifically, to a circuit for selectively outputting high frequency signals which selectively switches to and from high frequency signals from an antenna and high frequency signals from a RF modulator to output the same to a television receiver in a video cassette recorder (hereinafter referred to as VCR) containing a tuner.

2. Description of the Prior Art

Figure 1:
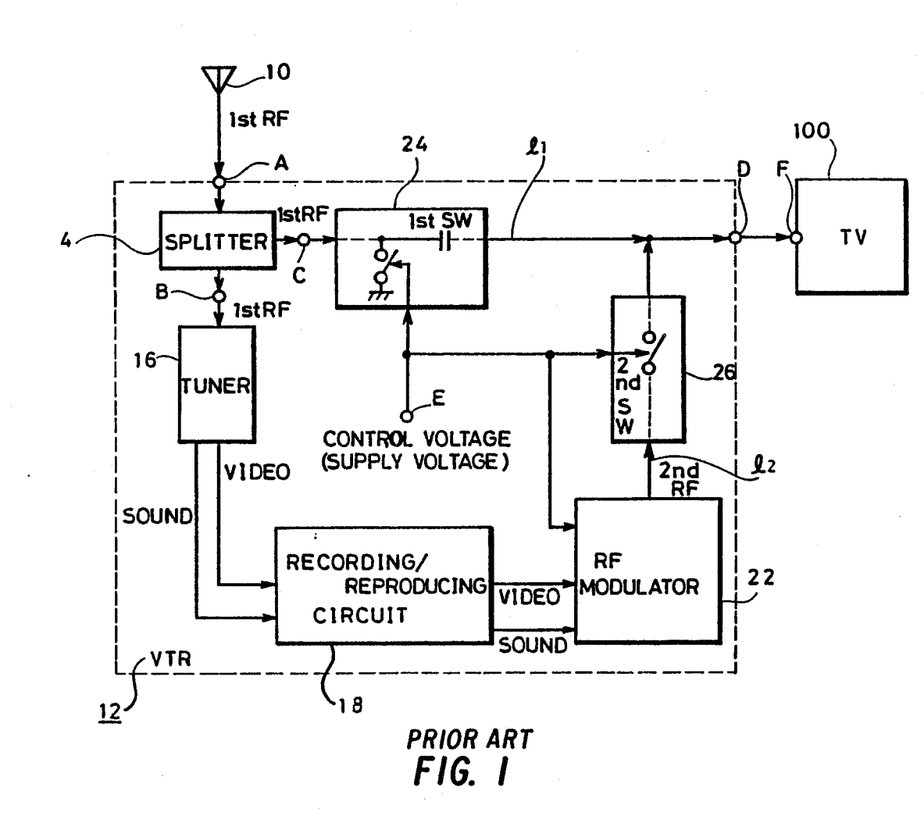
FIG. 1 is a block diagram showing a schematic structure of a conventional VCR containing a tuner.

FIG. 1 is block diagram showing a schematic structure of a conventional VCR containing a tuner such as shown in Japanese Utility Model Laying-Open Gazette No. 141637/1983. Referring to the figure, a television broadcasting signal (first high frequency signal) induced on an antenna 10 is inputted into a VCR 12 through an antenna input terminal A. A splitter 14 splits the first high frequency signal to output terminals B and C. The output terminal C is connected to an output terminal D for TV through a first transmission line 11. A first switch means 24 is provided on the first transmission line 11. The output terminal D for TV is connected to an antenna input terminal F of an external television receiver 100.

Meanwhile, the first high frequency signal applied to the output terminal B is applied to a tuner 16. The tuner 16 receives broadcasting signals of a desired channel from the first high frequency signal and applies video signals and audio signals of the channel to a recording-/reproducing circuit 18. The recording/reproducing circuit 18 records the applied video signals and audio signals on a magnetic tape, or it reproduces and outputs the video signals and audio signals recorded on the magnetic tape. The video signals and audio signals reproduced by the recording/reproducing circuit 18 are applied to a RF modulator 22. The RF modulator 22 converts the applied reproduced signals into high frequency signals (second high frequency signals) of a predetermined channel (channel 3 or 4 in the United States and channel 1 or 2 in Japan). An output of the RF modulator 22 is applied to the output terminal D for TV through a second transmission line 12 and through second switch means 26. The first and second switch means 24 and 26 have their on.off controlled by a control voltage applied to a control terminal E. The control voltage is also applied to the RF modulator 22, whereby the RF modulator 22 has its on.off controlled by the control voltage.

In the above described structure, when a low level control voltage is applied to the control terminal E, both first and second switch means 24 and 26 turn off. Therefore, the second transmission line 12 is cut off by the second switch means 26. Therefore, the first high frequency signals are outputted from the output terminal D for TV. At this time, the RF modulator 22 is off, so that the second high frequency signals are not outputted.

Meanwhile, if a high level (+B) control voltage is applied to the control terminal E, both first and second switch means 24 and 26 turn on. In addition, the RF modulator 22 is turned on to output the second high frequency signals. Therefore, the second high frequency signals outputted from the RF modulator 22 are applied to the output terminal D for TV through the second transmission line 12 and the second switch means 26. On this occasion, the first transmission line 11 is grounded by the first switch means 24. Therefore, the first high frequency signals applied to the first transmission line 11 from the splitter 14 are attenuated by the first switch means 24 and not transmitted to the output terminal D for TV. Namely, the first switch means 24 substantially cuts off the first transmission line 11.

As described above, the VCR of FIG. 1 selectively switches to and from the first high frequency signals from the antenna and the second high frequency signals from the RF modulator to output the same to the television receiver 100.

Meanwhile, in the VCR such as shown in FIG. 1, the circuit processing high frequency signals is shielded in order to prevent leak of the high frequency signals.

Figure 2:
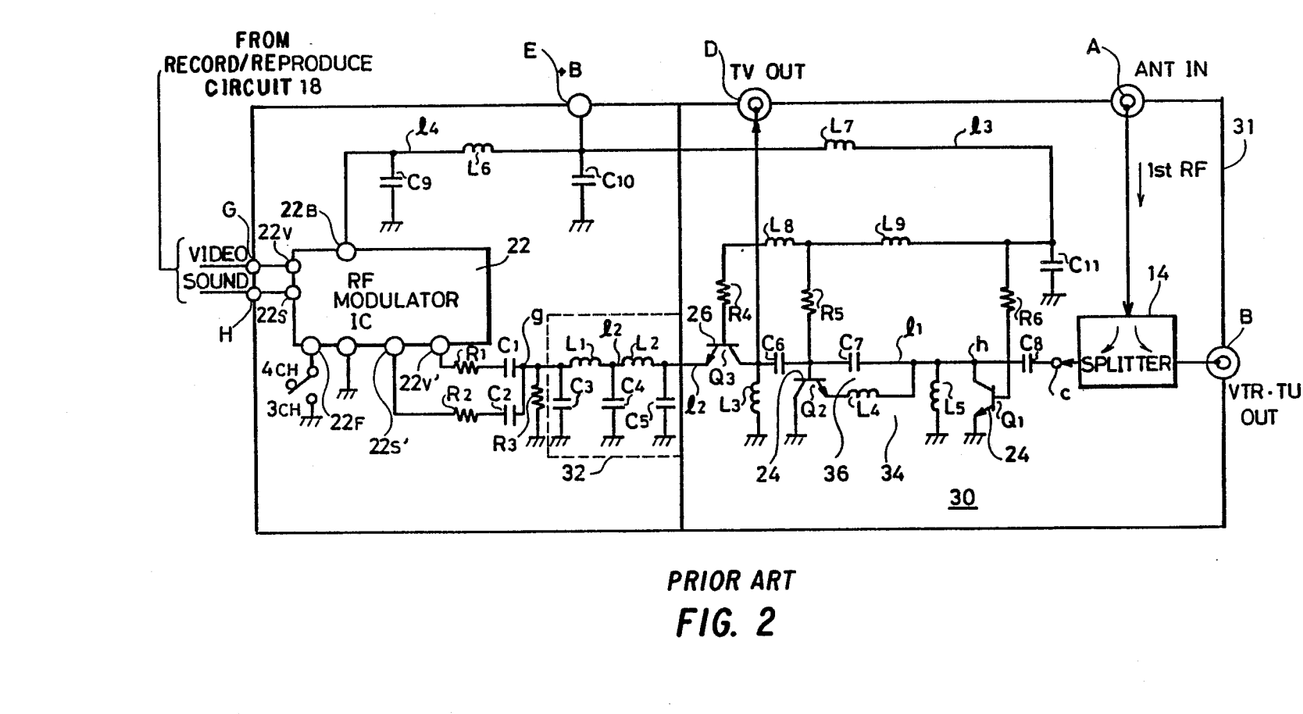
FIG. 2 is a schematic diagram showing one example of a conventional circuit for selectively outputting high frequency signals.

FIG. 2 is a schematic diagram showing the shielded high frequency circuit unit. Referring to the figure, the high frequency circuit 30 (comprising a splitter 14, an RF modulator 22, first and second switch means 24 and 26 and first and second transmission lines 11 and 12) is contained in a shield box 31. The shield box 31 is provided with an antenna input terminal A, an output terminal B, an output terminal D for TV, a control terminal E and, reproduced signal input terminals G and H. The television broadcasting signals (first high frequency signals) of VHF.UHF band (54~about 900 MHz) are splitted by the splitter 14 to be applied to the output terminals B and C. The output terminal B is connected to a tuner 16 contained in the VCR. The output terminal C is connected to one end of the first transmission line 11. The other end of the first transmission line 11 is connected to the output terminal D for TV. Capacitors C6, C7 and C8 are interposed in series in the first transmission line 11. Coils L3 and L5 are interposed in parallel between the first transmission line 11 and the ground. These capacitors C6 to C8 and the coils L3 and L5 constitute a high pass filter 34 which passes high frequency signals having the frequency higher than 50 MHz (50~1000 MHz). Transistors Q1 and Q2 constituting the first switch means 24 are provided in association with the first transmission line 11. The transistor Q1 has its collector connected to a node h between the capacitors C7 and C8, and its emitter grounded. A control voltage is applied from the control terminal E to the base of the transistor Q1 through the signal line 13 and a bias resistance R6. The transistor Q2 has its base connected to a node between capacitors C6 and C7. The control voltage is applied from the control terminal E to the base of the transistor Q2 through the signal line 13 and a bias resistance R5. The transistor Q2 has its emitter connected to said node h through the coil L4. The collector of the transistor Q2 is grounded. The coil L4 cooperates with the capacitor C7 to form a parallel resonance circuit 36 when the transistor Q2 is on.

The RF modulator 22 (implemented in an IC) comprises a voltage terminal 22B, a video input terminal 22V, an audio input terminal 22S, a video output terminal 22V', an audio output terminal 22S' and a channel setting terminal 22F. The control voltage is applied from the control terminal E to the voltage terminal B through the signal line 14. Capacitors C9 and C10 for high frequency attenuation are connected in parallel between the signal line 14 and the ground. The reproduced video signals and reproduced audio signals are applied from the recording/reproducing circuit 18 of FIG. 1 through the reproduced signal input terminals G and H to the video input terminal 22V and to the audio input terminal 22S, respectively. The RF modulator 22 converts the applied reproduced video signals and reproduced audio signals to high frequency video signals and audio signals of channel 3 or channel 4 to output the same from the video output terminal 22V' and from the audio output terminal 22S'. Whether the signals should be converted into channel 3 high frequency signals or channel 4 high frequency signals is determined by switching the channel switch connected to the channel setting terminal 22F. The high frequency video signals outputted from the video output terminal 22V' are supplied to a node g through a resistance R1 for attenuation and through a capacitor C1 for cutting direct current. The high frequency audio signals outputted from the audio output terminal 22S' are supplied to the node g through a resistance R2 for attenuation and a capacitor C2 for cutting direct current. The amount of attenuation by the resistances R1 and R2 are appropriately selected in accordance with the specification of the finished product. A resistance R3 is interposed between the node g and the ground for setting the output impedance at 75 $\Omega$. The node g is connected to the emitter of the transistor Q3 through the second transmission line 12. A low pass filter 32 constituted by coils L1 and L2 and capacitors C3 to C5 is interposed in the second transmission line 12. The low pass filter 32 has its high frequency signal passing characteristics set such that the second high frequency signals (60 to 70 MHz) of channel 3 or channel 4 outputted from the RF modulator 22 are passed therethrough. Therefore, the low pass filter 32 removes the higher order harmonic component of the second high frequency signals (the second order harmonic component is, for example, 120~150 MHz). The transistor Q3 is an NPN transistor constituting the second switch means 26. The transistor Q3 has its collector connected to the output terminal D for TV. The control voltage is applied from the control terminal E to the base of the transistor Q3 through the signal line 13 and the bias resistance R4.

The operation of the high frequency circuit unit shown in FIG. 2 will be described in the following.

First, description will be given of the operation when a low level control voltage is applied to the control terminal E. In this case, the RF modulator 22 do not operate, so that the second high frequency signals are not outputted. Transistors Q1 to Q3 are all off. Therefore, the coils L3 and L5 and the capacitors C6 to C8 constitute a high pass filter 34. As described above, the high pass filter 34 passes the high frequency signals of 50 to 1000 MHz, so that the entire band of the first high frequency signals of VHF.UHF band outputted from the splitter 14 are passed therethrough. Consequently, the first high frequency signals inputted to the antenna input terminal A are outputted to the output terminal D for TV through the high pass filter 34.

Next, description will be given of the operation when a high level control voltage is applied to the control terminal E. In this case, the RF modulator 22 operates to output the second high frequency signals. On this occasion, the transistor Q3 is on. Therefore, the second high frequency signals outputted from the RF modulator 22 are applied to the output terminal D for TV through the low pass filter 32 and the transistor Q3. Meanwhile, on this occasion, both transistors Q1 and Q2 are turned on. Therefore, the first transmission line 11 is grounded by the transistor Q1. Therefore, first high frequency signals outputted from the splitter 14 to the first transmission line 11 are brought to the ground through the transistor Q1 to be attenuated. However, in the high frequency signal band, the on characteristics (conductivity) of the transistor Q1 is not perfect. Therefore, the first high frequency signals from the splitter 14 are not sufficiently attenuated, and therefore, the signals may possibly be transmitted to the output terminal D for TV. On this occasion, however, the transistor Q2 is on and the coil L4 is connected in parallel to the capacitor C7 to form a parallel resonance circuit 36. The values of the capacitor C7 and the coil L4 are previously selected such that the resonance frequency of the parallel resonance circuit 36 will be the band (60 to 72 MHz) of the channel 3 or channel 4 high frequency signal. Therefore, the parallel resonance circuit 36 prevents the transmission of the high frequency signals of channel 3 or channel 4 band. Namely, the first high frequency signals which have not sufficiently been attenuated by the transistor Q1 are further attenuated by the parallel resonance circuit 36. In addition, since the base of the transistor Q2 is connected to a node of capacitors C6 and C7, the signals on the first transmission line 11 are grounded between the base and emitter of the transistor Q2, so that they are further attenuated. Therefore, the first high frequency signals are hardly transmitted to the output terminal D for TV. The parallel resonance circuit 36 also prevents the passage of the second high frequency signals from the RF modulator 22. More specifically, the parallel resonance circuit 36 has the following two functions.

(1) It prevents the channel 3 or channel 4 signal components (60~72 MHz) out of the first high frequency signals (50~900 MHz) inputted to the antenna input terminal A from leaking to the output terminal D for TV through the first transmission line 11, thereby preventing mixture of the same with the second high frequency signals from the RF modulator 22.

(2) It prevents leak of the second high frequency signals from the RF modulator 22 to the antenna input terminal A and to the output terminal B reversely through the first transmission line 11.

Meanwhile, the RF modulator 22 contains a high frequency carrier signal oscillation circuit for converting the reproduced signals into high frequency signals of 60 to 72 MHz. As is well known, the high frequency signals are apt to leak. Therefore, the carrier signals and the higher order harmonic components thereof are considerably leaking out to the voltage terminal 22B of the RF modulator 22. If such carrier signals and the like goes out of the shield box, they affect other circuits as unnecessary radiation. Therefore, capacitors C9 and C10 are provided in the signal line 14 to attenuate these carrier signals and the like. In addition, such carrier signals and the like are also attenuated by a distribution inductance L6 existing in the signal line 14. The signal line 14 is bent so as to positively increase the value of the inductance L6 in order to enhance the effect of attenuation by the distribution inductance L6.

The circuit similar to the circuit shown in FIG. 2 is disclosed in Japanese Utility Model Laying-Open Gazette No. 7134/1986.

As described above, in the circuit of FIG. 2, the higher order harmonic components (the second order harmonic 120~146 MHz, the third order harmonic 180~20 MHz and so on of the second high frequency signals outputted from the RF modulator 22 are removed by the low pass filter 32. However, the removal is not perfect. In addition, the parallel resonance circuit 36 do not prevent the passage of the higher order harmonic components. The higher order harmonic components are not sufficiently attenuated only by the grounding between the collector and emitter of the transistor Q1 and between the base and the collector of the transistor Q2. Therefore, in the circuit of FIG. 2, the higher order harmonic components leak to the antenna input terminal A and to the output terminal B.

In the circuit of FIG. 2, when the transistors Q1 and Q2 are off, namely, when the first high frequency signals from the antenna input terminal A are selected to be outputted from the output terminal D for TV, the collector-emitter capacitance of the transistor Q1 and the base-collector capacitance of the transistor Q2 are interposed between the first transmission line 11 and the ground. Therefore, the first high frequency signals transmitted on the first transmission line 11 are undesirably attenuated by these capacitances. Now, the base-collector capacitance of a transistor is approximately twice the collector-emitter capacitance. Namely, in the circuit of FIG. 2, the undesirable attenuation of the first high frequency signals by the first switch means 24 becomes especially large at the transistor Q2.

Figure 3:
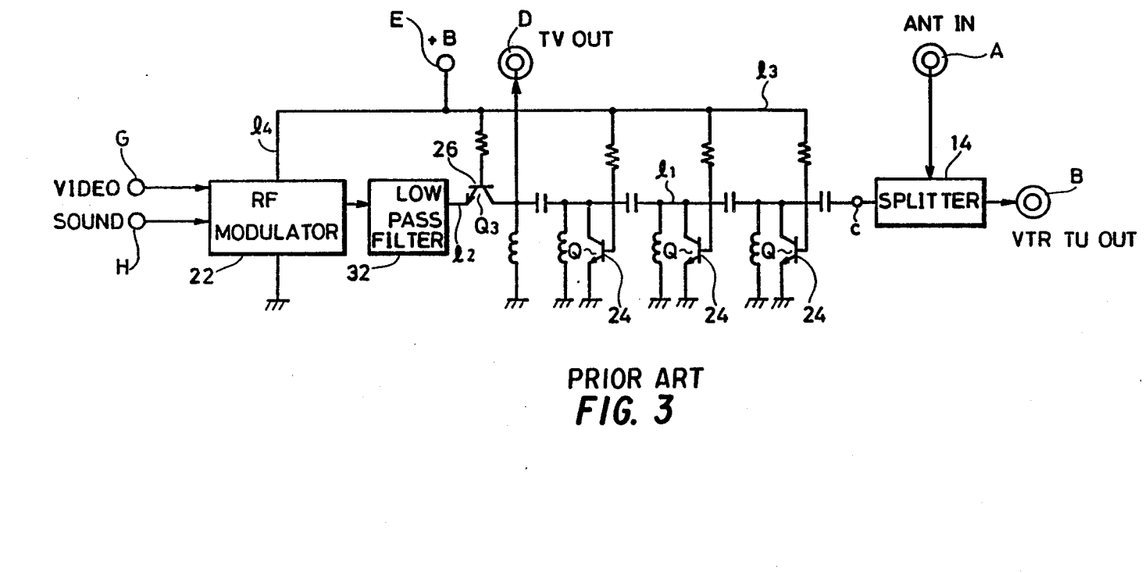
FIG. 3 is a schematic diagram showing another example of a conventional circuit for selectively outputting high frequency signals.

FIG. 3 is a schematic diagram showing another example of a conventional high frequency circuit unit shown in FIG. 11(a) of SANYO TECHNICAL REVIEW Vol. 15 No. 2 Aug. 1983 pp. 59-64.

In this circuit of FIG. 3, three transistors Q are used as the first switch means 24. These three transistors have their collectors connected to the first transmission line 11 and their emitters grounded. Control voltage is applied from the control terminal E to the base of each of the transistors. Therefore, in the circuit of FIG. 3, when the second high frequency signals from the RF modulator 22 are selected to be outputted to the output terminal D for TV, the first transmission line 11 is grounded by the three transistors Q. Therefore, the amount of attenuation of the high frequency signals, especially in the higher order harmonics band of the RF modulator passing through the first transmission line 11 can be increased compared with the conventional circuit shown in FIG. 2.

Therefore, in the conventional circuit shown in FIG. 3, the amount of attenuation at high frequency of the first high frequency signals passing through the first transmission line 11 can be increased when the second high frequency signals are selected, and the amount of attenuation in the higher order harmonics band of the high frequency signals passing reversely from the RF modulator 22 to the splitter 14 can be increased compared with the conventional circuit shown in FIG. 2. However, the circuit of FIG. 3 has another problem of higher cost, since the number of transistors constituting the first switch means 24 is increased compared with the circuit of FIG. 2.

In the circuit of FIG. 3, when three transistors Q are off, namely, when the first high frequency signals from the antenna input terminal A are outputted to the output terminal D for TV, the collector-emitter capacitances of the transistor Q are interposed between the first transmission line 11 and the ground. As for each transistor, a large capacitance such as in the case of the transistor Q2 in the circuit of FIG. 2 is not connected between the first transmission line 11 and the ground. However, the number of the transistors is increased compared with the circuit of FIG. 2, so that the undesirable attenuation of the first high frequency signals is not improved when viewed as a whole.

Meanwhile, when the second high frequency signals of channel 3 or channel 4 from the RF modulator 22 should be outputted to the output terminal D for TV, the transistor Q is naturally on in the circuit of FIG. 2. On this occasion, the second high frequency signals are leaking out to the base of the transistor Q3. Since the carrier components for video signals have higher level, the leakage of carrier component is especially large. The leaking carrier components flow into the base of the transistor Q1 through bias resistances R4 and R6. And the carrier components leak out to the antenna input terminal A and the output terminal B through the collector of the transistor Q1→capacitor C8→2 splitter 14.

In order to prevent such leak of carrier components, it is proposed to provide a capacitor C11 for grounding high frequency on the signal line 13 connected to the base of the transistor Q3 and to the base of the transistors Q1. However, the signal line 13 comprises distribution inductances L7, L8, L9 and the like. In the actual circuit, we can not determine how and where the distribution inductances L7, L8 and L9 are generated on the signal line. In addition, different products have different values of the distribution inductances L7, L8 and L9. Consequently, the portion where the capacitor C11 for grounding high frequency is connected to the signal 13 should be experimentally found by the repetition of actual connection of the capacitor C11 and the examination of the characteristics. However, the found position for connection is not always available to other products.

As described above, it is very difficult to provide a capacitor C11 for grounding high frequency removing the carrier components leaking out from the transistor Q3 to the transistor Q1 through the signal line L3.

Therefore, it is proposed that the control voltage of the transistor Q3 should be supplied through the signal line 14 instead of the signal line 13. By doing so, the carrier components leaked to the base of the transistor Q3 are attenuated by the capacitors C9 and C10 and by the distribution inductance L6, so that they do not affect the transistor Q1.

However, the higher order harmonic components and the like of the carrier frequency are leaking out from the carrier signal oscillation circuit in the RF modulator to the voltage terminal 22B of the RF modulator 22, as described above. Therefore, the leaked higher order harmonic components leak out to the output terminal D for TV through the signal line 14 and through the transistor Q3, which is disadvantageous.

SUMMARY OF THE INVENTION

An object of the present invention is to improve high frequency signal stopping characteristics of a first transmission line when second high frequency signals are selected with least number of transistors constituting first switch means.

Another object of the present invention is to improve high frequency signal passing characteristics of the first transmission line when first high frequency signals are selected with least number of transistors constituting the first switch means.

A further object of the present invention is to provide a circuit for selectively outputting high frequency signals capable of applying a control voltage to second switch mans without any bad influence caused by leakage of the high frequency signals.

Briefly stated, in the present invention, first switch means provided on a first transmission line transmitting first high frequency signals from an input terminal to an output terminal for switching passage and cut off of the frequency signals is constituted by at least a pair of grounding transistors interposed between a reference potential point and both ends of a first passive device forming a portion of filter means and a second passive device connected between bases of the grounding transistors. The second passive device is connected in parallel to the first passive device to form a parallel resonance circuit together with the first passive device when the grounding transistors are turned on. The parallel resonance circuit has its resonance frequency selected so as to stop the passage of the signals in the same band as the second high frequency signals.

In another aspect of the present invention, filter means is provided for stopping the passage of harmonic components of second high frequency signals in a second transmission line transmitting second high frequency signals from the RF modulator to an output terminal, and second switch means is provided for switching the passage and cut off of the high frequency signals in the second transmission line. The second switch means is constituted by a switching diode, and the control voltage which should be applied to the diode is applied to the second transmission line in the preceding stage of the filter means.

According to the present invention, all transistors constituting the first switch means are used as the transistors for grounding high frequency, and, at the same time, a parallel resonance circuit is formed in the first transmission line when the transistors are off. Therefore, the high frequency signal stopping characteristics of the first transmission line when the second high frequency signals are selected can be improved without increasing the number of transistors.

All transistors constituting the first switch means have their collectors and emitters interposed between the first transmission line and the reference potential point, so that the capacitances between the first transmission line and the reference potential point derived from these transistors can be minimized. Consequently, the high frequency signal passing characteristics of the first transmission line when the first high frequency signals are selected can be improved.

In addition, according to the present invention, the control voltage applied to the diode constituting the second switch means is applied through filter means provided in the second transmission line, so that the leakage of the high frequency component to other circuits through the application path of the control voltage can be prevented.

These objects and other objects, features, aspects and advantages of the present invention will become more apparent from the following detailed description of the present invention when taken in conjunction with the accompanying drawings.

DESCRIPTION OF THE PREFERRED EMBODIMENTS

First, referring to FIG. 4, a first embodiment of the present invention will be described. Meanwhile, in FIG. 4, the same or corresponding portions as the conventional circuit shown in FIGS. 2 and 3 are denoted by the same reference numerals and the description thereof is omitted appropriately.

Figure 4:
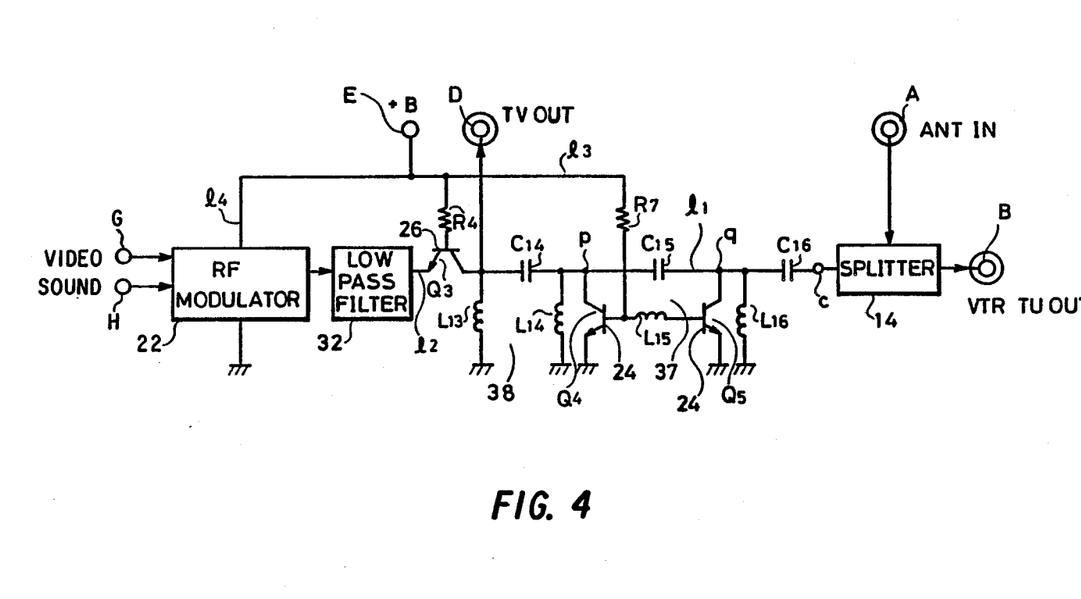
FIG. 4 is a schematic diagram showing a structure of a first embodiment in accordance with the present invention.

Referring to FIG. 4, capacitors C14, C15 and C16 are interposed in series in the first transmission line 11. Coils L13, L14 and L16 are interposed in parallel between the first transmission line 11 and the ground. These capacitors C14 to C16 and the coils L13, L14 and L16 constitute a high pass filter 38 which passes high frequency signals of 50 to 1000 MHz. One end and the other end of the capacitor C15 are connected to the collectors of the transistors Q4 and Q5 at nodes p and q, respectively. These transistors Q4 and Q5 constitute first switch means 24 and their emitters are grounded. A coil L15 is connected between the bases of the transistors Q4 and Q5. The coil L15 cooperates with the capacitor C15 to form a parallel resonance circuit 37 when the transistors Q4 and Q5 are on. The resonance frequency of the parallel resonance circuit 37 is selected to be the band (60~72 MHz) of the channel 3 or channel 4 high frequency signals. Therefore, when the transistors Q4 and Q5 are on, the parallel resonance circuit 37 prevents the transmission of the high frequency signals in the band of 3 channel or 4 channel. A control voltage is applied from the control terminal E to the base of the transistor Q4 through the signal line 13 and the bias resistance R7. The control voltage is also applied to the base of the transistor Q5 through the coil L15.

In the above described structure, when a low level voltage is applied to the control terminal E, the transistors Q3 to Q5 and the RF modulator 22 are all turned off. Therefore, the first high frequency signals from the antenna input terminal A are transmitted to the output terminal D for TV through the first transmission line 11. On this occasion, the collector-emitter capacitances of the transistors Q4 and Q5 are connected between the ground and the first transmission line 11. Therefore, compared with the conventional circuit shown in FIGS. 2 and 3, the capacitance value generated between the first transmission line 11 and the ground is reduced whereby the amount of attenuation of the first high frequency signals is reduced. More specifically, in the embodiment of FIG. 4, the high frequency signal passing characteristics of the first transmission line 11 when the first high frequency signals are selected to be outputted is improved compared with the conventional circuits shown in FIGS. 2 and 3.

Figure 5A:
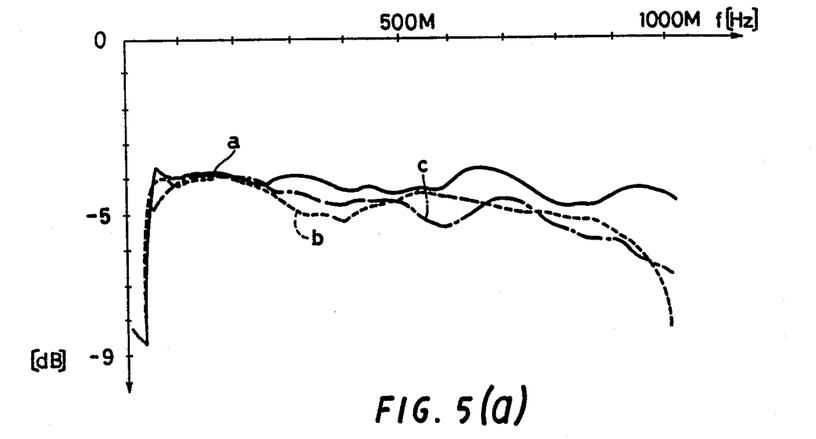
FIG. 5(a) and (b) are graphs showing the improvement of the high frequency signal passing characteristics and the high frequency signal stopping characteristics in accordance with the embodiment shown in FIG. 4.

The high frequency signal passing characteristics from the antenna input terminal A to the output terminal D for TV when the first high frequency signals are selected to be outputted is shown in FIG. 5(a). In FIG. 5(a), the solid line a shows the characteristics of the circuit shown in FIG. 4, the dotted line b shows the characteristics of circuit shown in FIG. 3 and the chain dotted line c shows the characteristics of the circuit shown in FIG. 2.

When a high level voltage is applied to the control terminal E, the transistors Q3 to Q5 and the RF modulator 22 are all turned on. Therefore, the second high frequency signals outputted from the RF modulator 22 are transmitted to the output terminal D for TV through the low pass filter 32 and the transistors Q3. On this occasion, the second high frequency signal and the higher order harmonics components thereof which are passing reversely from the second transmission line 12 to the first transmission line 11 to leak out to the antenna input terminal A are attenuated by the grounding of the first transmission line 11 by the transistors Q4 and Q5. In addition, the resonance circuit 37 prevents the passage of the second high frequency signals. The first high frequency signals from the antenna input terminal A are sufficiently attenuated by the grounding of the first transmission line 11 by the transistors Q5 and Q4.

In the embodiment of FIG. 4, capacitors C14 and C15 are used instead of the capacitors C6 and C7 in the conventional circuit shown in FIG. 2, and a coil L14 is added. Accordingly, if the passband of the high pass filter 38 is designed to be equal to that of the high pass filter 34 in FIG. 2 when the first high frequency signals are selected, the value of the capacitors C14 and C15 of FIG. 4 can be one half of the value of capacitors C6 and C7 of FIG. 2. Consequently, the high frequency impedance of the capacitor C14 can be set high. Therefore, the high frequency signal stopping characteristics of the first transmission line is naturally improved compared with the conventional circuit shown in FIG. 2. Besides, the high frequency signal stopping characteristics is further improved by the parallel resonance circuit 37, so that the high frequency signal stopping characteristics is not inferior to the conventional circuit shown in FIG. 3.

Figure 5B:
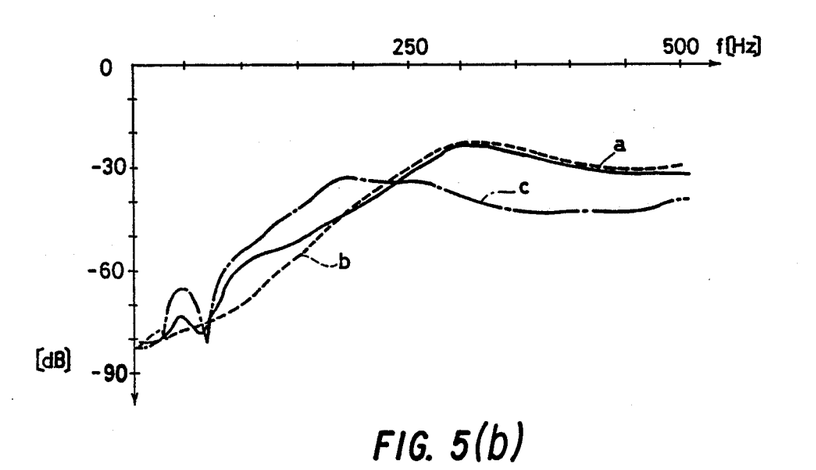

The high frequency signals stopping characteristics from the antenna input terminal A to the output terminal D for TV when the second high frequency signals are selected to be outputted is shown in FIG. 5(b). In FIG. 5(b), the solid line a shows the characteristics of the circuit shown in FIG. 4, the dotted line b shows the characteristics of the circuit shown in FIG. 3, and the chain dotted line c shows the characteristics of the circuit shown in FIG. 2.

Figure 6:
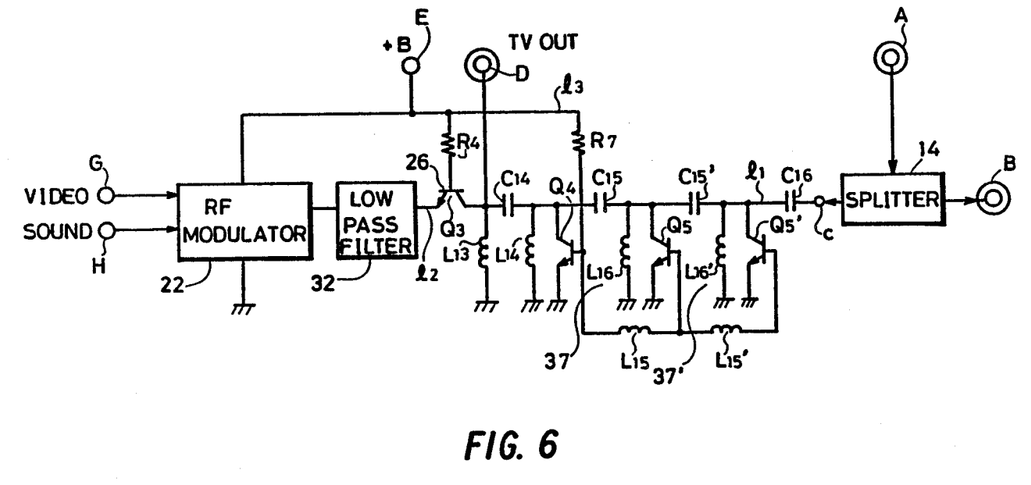
FIG. 6 is a schematic diagram showing a structure of a second embodiment in accordance with the present invention.

FIG. 6 is a schematic diagram showing a second embodiment of the present invention. In this embodiment, compared with the embodiment of FIG. 4, a transistor is added for short circuiting the first transmission line 11 to the ground level. The transistor Q5' is the additional one. In association with the addition, a capacitor C15' is interposed between the capacitors C15 and C16, and a coil L16' is interposed between the first transmission line 11 and the ground. A coil L15' is connected between the bases of the transistors Q5 and Q5'. The coil L15' cooperates with the capacitor C15' to form a parallel resonance circuit 37' when the transistors Q5 and Q5' are on.

According to the embodiment of FIG. 6, when the second high frequency signals are selected to be outputted, the first transmission line 11 is grounded by three transistors Q4, Q5 and Q5', so that the high frequency signal stopping characteristics of the first transmission line 11 can be improved compared with the embodiment of FIG. 4. However, the high frequency passing characteristics of the first transmission line 11 when the first high frequency signals are selected to be outputted is degraded to the level of the conventional circuit shown in FIGS. 2 and 3.

Figure 7:
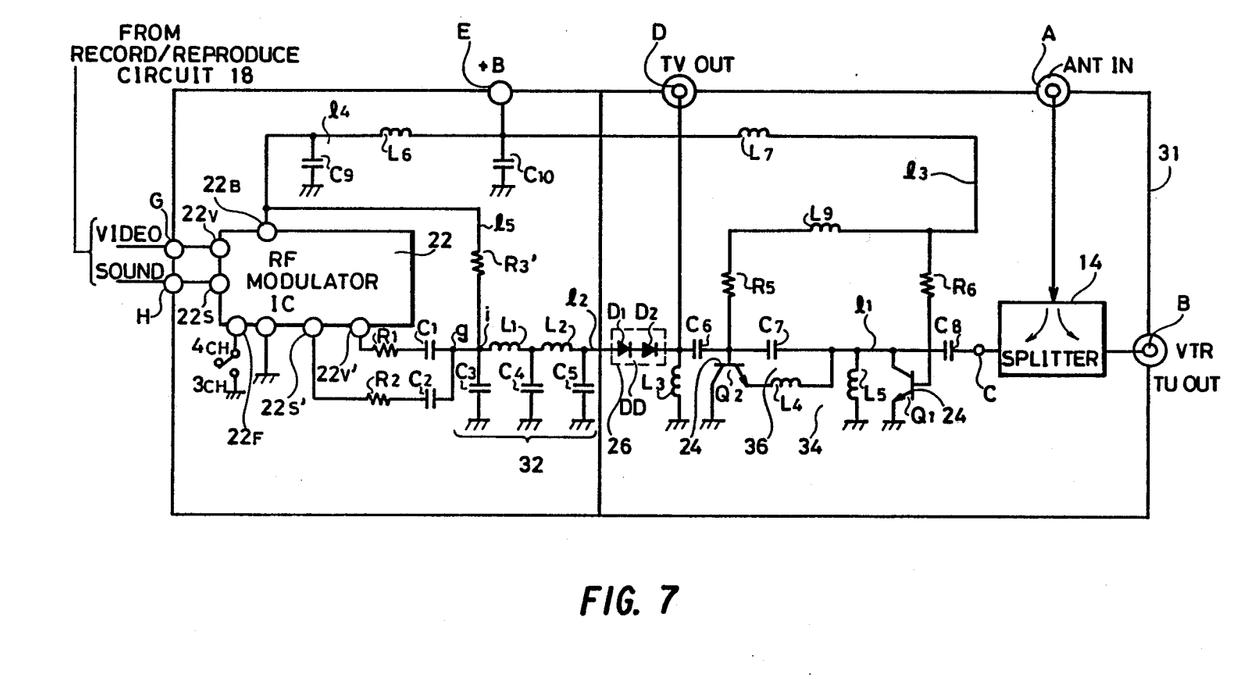
FIG. 7 is a schematic diagram showing a structure of a third embodiment in accordance with the present invention.

FIG. 7 is a schematic diagram showing a third embodiment of the present invention. In FIG. 7, the same portions as the conventional circuit shown in FIG. 2 are denoted by the same reference numerals and the description thereof is omitted. The characteristics of the embodiment is that a double diode DD is employed as the second switch means 26 and that the control voltage to the double diode DD is applied from the control terminal E to the input terminal I of the low pass filter 32 through the signal lines 14 and 15 and the resistance R3'. The double diode DD comprises a series connection of two diodes D1 and D2, and is interposed in the second transmission line 12 in the succeeding stage of the low pass filter 32. Two diodes are employed for the second switch means 26 in order to prevent malfunction of the second switch means 26. The second switch means 26 should be turned off when the first high frequency signals from the antenna input terminal A are selected to be outputted to the output terminal D for TV. If the level of the first high frequency signals is higher than 100 dB$\mu$V (represented with 1 $\mu$V being the reference (0 dB$\mu$V) and the number of diodes employed is only one, then a diode may possibly be turned on when the cathode side becomes negative potential to cause intermodulation distortion. Therefore, two diodes are employed for the second switch means 26 to prevent the malfunction of the second switch means 26. Meanwhile, the resistance R3' serves as a bias supplying resistance and, in addition, it also sets the output impedance at 75 $\Omega$.

The operation of the embodiment shown in FIG. 7 will be described in the following.

First, when a low level voltage is supplied to the control terminal E, the RF modulator 22, the double diode DD and the transistors Q1 and Q2 are all turned off, and the high frequency signals from the antenna input terminal A are transmitted to the output terminal D for TV through the first transmission line 11.

Meanwhile, when a high level voltage is applied to the control terminal E, the control voltage is applied to the input end i of the low pass filter 32 through the signal lines 14 and 15. The control voltage is supplied to the anode side of the double diode DD through the low pass filter 32, to render the double diode DD conductive. The higher order harmonics components of the carriers leaking out from the voltage terminal B from the RF modulator is also leaking out to the signal line 15. However, the higher order harmonics components of the carriers are attenuated by the low pass filter 32, so that they are not transmitted to the double diode DD. Therefore, there will be no higher order harmonics signals introduced in the double diode DD.

When a high level voltage is applied to the control terminal E, the RF modulator 22 operates to output the second high frequency signals. As described above, the double diode DD is on at this time, so that the second high frequency signals are outputted to the output terminal D for TV through the low pass filter 32 and the double diode DD. On this occasion, the transistors Q1 and Q2 are also turned on to cut off the passage of the first high frequency signals and prevents the reverse passage of the second high frequency signals.

Figure 8:
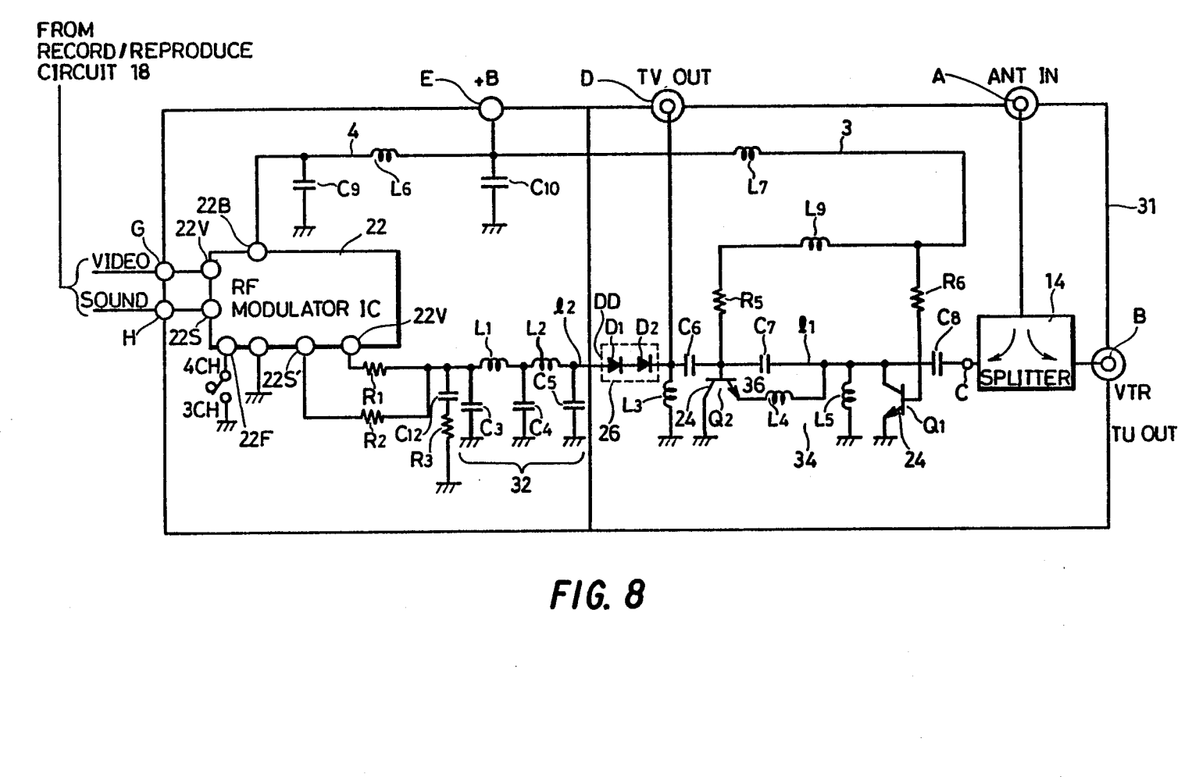
FIG. 8 is a schematic diagram showing a structure of a fourth embodiment in accordance with the present invention.

FIG. 8 is a schematic diagram showing a fourth embodiment of the present invention. In FIG. 8, the same portions as the conventional circuit of FIG. 2 are denoted by the same reference numerals and the description thereof is omitted. In this embodiment, a double diode DD is used as the second switch means 26 as in the embodiment shown in FIG. 7. However, the control voltage to turn on the double diode DD is outputted from the video output terminal 22V' and the audio output terminal 22S' of the RF modulator 22. The output circuit (provided in the RF modulator 22) of the video output terminal 22V' and the audio output terminal 22S' is constituted by an emitter follower. Therefore, a current having sufficient value to turn on the double diode DD is outputted from these output terminals 22V' and 22S'. A capacitor C12 for cutting direct current is interposed between the second transmission line 12 and the resistance R3 for setting the output impedance at 75 Ω. The capacitor C12 prevents the decrease of current for turning on the double diode DD caused by the direct current flowing in the resistance R3.

In the circuit of FIG. 8, when the second high frequency signals are to be outputted from the output terminal D for TV by applying a high level voltage to the control terminal E, a high level voltage is applied to the voltage terminal 22V of the RF modulator 22 to operate the RF modulator 22. The video output terminal 22V' and the audio output terminal 22S' respectively output video and audio high frequency signals as well as a direct voltage signal. The direct voltage signal turns on the double diode D through the second transmission line 12. Therefore, the second high frequency signals are outputted from the output terminal D for TV.

Meanwhile, in the circuit of FIG. 8, the operation when a low level voltage is applied to the control terminal E is as the same as that of the embodiment shown in FIG. 7. Namely, in that case, RF modulator 22 do not operate, the double diode DD is off and therefore, the first high frequency signals from the antenna input terminal A are outputted to the output terminal D for TV through the first transmission line 11.

As described above, in the embodiment of FIG. 8, the control voltage for turning on the double diode DD is outputted from the video output terminal 22V' and the audio output terminal 22S' to be applied to the double diode DD through the low pass filter 32, so that the signal line 15 in the circuit of FIG. 7 can be eliminated. Therefore, the circuit structure can be simplified.

Figure 9:
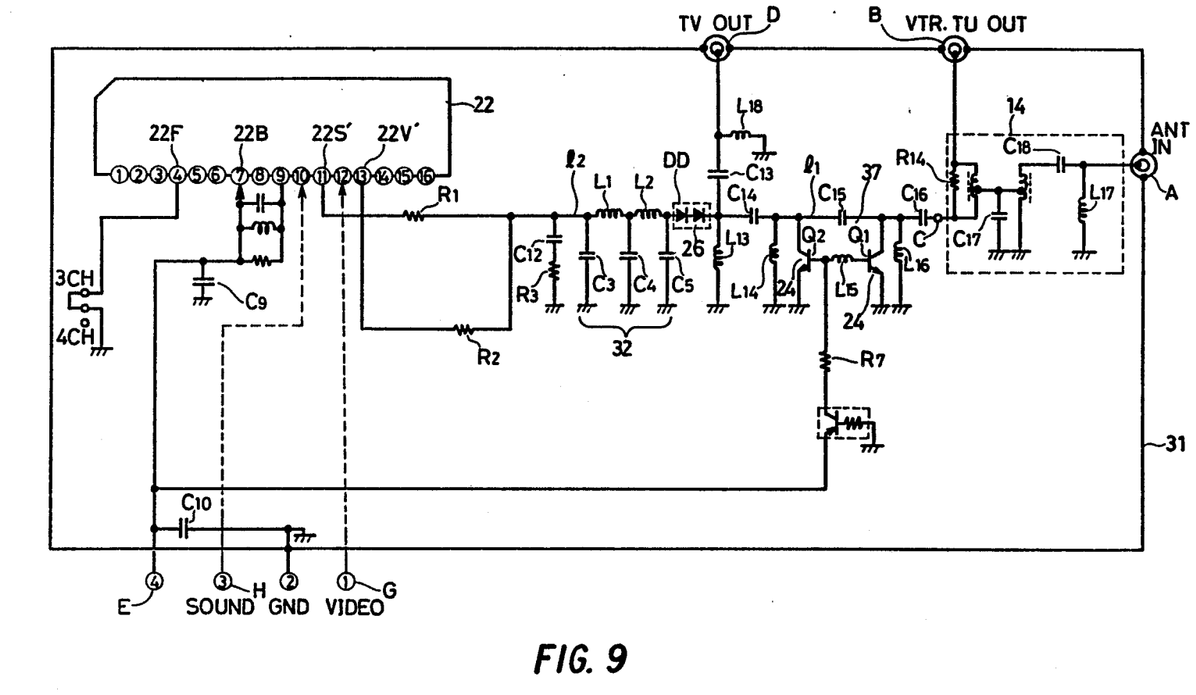
FIG. 9 is a schematic diagram showing a structure of a fifth embodiment in accordance with the present invention.

FIG. 9 is a schematic diagram showing a fifth embodiment of the present invention. This embodiment is a combination of the embodiments shown in FIGS. 4 and 8, and operates in the similar manner as the circuit shown in FIG. 4 or 8. Therefore, the embodiment of FIG. 9 have the advantages of both embodiments shown in FIGS. 4 and 8. In FIG. 9, the same portions as the circuits shown in FIG. 4 or 8 are denoted by the same reference numerals.

In the following, specifications or values of each of the devices in the circuit of FIG. 9 will be described. Each coil in the circuit of FIG. 9 is an air core coil, with the value (henry value) varies dependent on the frequency. The value of the air core coil can be adjusted by an adjusting jig. Therefore, the value of the coil is a reference value.

RF modulator 22 . . . LA7055, produced by Sanyo Electric Co., Ltd.
Q1, Q2 . . . 2SC2735, produced by Hitachi, Ltd.
Q4 . . . transistors containing resistance, RN2411, produced by Toshiba Corp.
DD . . . 1SS226, produced by Toshiba Corp.
C10 . . . 0.01 μF
C9 . . . 0.01 μF
R1 . . . 4.7 KQ
R2 . . . 1 KQ
C12 . . . 1200 pF
R3 . . . 56 Ω
C3 . . . 39 pF
L1 . . . 198 nH
C4 . . . 68 pF
L2 . . . 201 nH
C5 . . . 33 pF
C13 . . . 39 pF
L18 . . . 290 nH
L13 . . . 145 nH
C14 . . . 27 pF
L14 . . . 150 nH
C15 . . . 22 pF
L15 . . . 155 nH
L16 . . . 153 nH
C16 . . . 39 pF
R14 . . . 180 Ω
C17 . . . 4 pF
C18 . . . 100 pF
L17 . . . 276 nH
R7 . . . 390 Ω

Although the control voltages from the video output terminal 22V' and from the audio output terminal 22S' are both applied to the double diode DD in the embodiment of FIG. 9, the double diode DD may be turned on only by the control voltage from one terminal by interposing a capacitor in the signal line to the other terminal.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A circuit for selectively outputting high frequency signals which selectively switches between first high frequency signals inputted from an input terminal and second high frequency signals outputted from a RF modulator to output the same from an output terminal, comprising:

a first transmission line transmitting said first high frequency signals from said input terminal to said output terminal;

a second transmission line transmitting said second high frequency signals from said RF modulator to said output terminal;

first filter means including a plurality of first passive devices interposed in series in said first transmission line for determining high frequency signal passing characteristics of the first transmission line;

first switch means provided in said first transmission line for switching between passage and cut off of the high frequency signal in said first transmission line in response to an applied first control voltage;

second switch means provided in said second transmission line for switching complementary with said first switch means between the passage and cut off of the high frequency signals in said second transmission line in response to an applied second control voltage;

first control voltage supplying means for supplying said first control voltage to said first switch means; and second control voltage supplying means for supplying said second control voltage to said second switch means; wherein said first switch means comprises at least two grounding transistors having their collectors and emitters interposed between both ends of a first passive device and a reference potential point and their bases receiving said first control voltage, and a second passive device connected between bases of said at least two grounding transistors; and when said grounding transistors are turned on, said second passive device is connected in parallel to said first passive device to form a parallel resonance circuit with the first passive device, with the parallel resonance circuit has its resonance frequency selected to stop the passage of signals in the same band as said second high frequency signals.

2. A circuit for selectively outputting high frequency signals according to claim 1, wherein
said grounding transistors are provided for more than two of said plurality of first passive devices.

3. A circuit for selectively outputting high frequency signals according to claim 1, wherein
said first passive device is a capacitor, and
said second passive device is a coil.

4. A circuit for selectively outputting high frequency signals according to claim 1, which further comprises
second filter means provided in said second transmission line for removing harmonics component of said second high frequency signals.

5. A circuit for selectively outputting high frequency signals according to claim 4, wherein
said second switch means comprises a switching diode provided in said second transmission line between, said second filter means and said output terminal.

6. A circuit for selectively outputting high frequency signals according to claim 5, wherein
said second control voltage supplying means applies said second control voltage to said second transmission line in the preceding stage of said second filter means so that said second control voltage is supplied to said diode through said second filter means.

7. A circuit for selectively outputting high frequency signals according to claim 1, wherein
said second switch means comprises a switching transistor interposed in said second transmission line, with said second control voltage applied to the base thereof.

8. A circuit for selectively outputting high frequency signals according to claim 1, wherein
the circuit is employed in a magnetic recording/reproducing apparatus containing a tuner.

9. A circuit for selectively outputting high frequency signals according to claim 8, wherein
said first high frequency signals are high frequency signals for television broadcasting, and said second high frequency signals are high frequency signals in a specified channel range in television broadcasting.

10. A circuit for selectively outputting high frequency signals selectively switching between first high frequency signals inputted from an input terminal and second high frequency signals outputted from a RF modulator to output the same from an output terminal, comprising:

first transmission line transmitting said first high frequency signals from said input terminal to said output terminal;

second transmission line transmitting said second high frequency signals from said RF modulator to said output terminal;

filter means provided in said second transmission line for stopping passage of harmonics component of said second high frequency signals;

first switch means provided in said first transmission line for switching passage and cut off of high frequency signals in the first transmission line in response to an applied first control voltage;

second switch means provided in said second transmission line for switching complementary with said first switch means the passage and cut off of the high frequency signals in the second transmission line in response to an applied second control voltage;

first control voltage supplying means for supplying said first control voltage to said first switch means; and second control voltage supplying means for supplying said second control voltage to said second switch means; wherein said second switch means comprises a switching diode provided in said second transmission line between said second filter and said output terminal; and said circuit further comprises means for applying said control voltage to said second transmission line in the preceding stage of said filter means so that said second control voltage is supplied to said diode through said second control voltage supplying means and said second filter means.

11. A circuit for selectively outputting high frequency signals according to claim 10, which further comprises:
a control voltage input terminal for inputting the control voltage; wherein
said second control voltage supplying means comprises means for applying the control voltage inputted from said control voltage input terminal to said second transmission line in the preceding stage of said filter means.

12. A circuit for selectively outputting high frequency signals according to claim 10, wherein said second control voltage supplying means comprises means for applying a direct current voltage signal outputted from said RF modulator to said second transmission line in the preceding stage of said filter means.

13. A circuit for selectively outputting high frequency signals according to claim 10, wherein
said second switch means is constituted by a series connected plurality of switching diodes.

14. A circuit for selectively outputting high frequency signals according to claim 10, which is employed in a magnetic recording/reproducing apparatus containing a tuner.

15. A circuit for selectively outputting high frequency signals according to claim 14, wherein
said first high frequency signals are high frequency signals for television broadcasting, and
said second high frequency signals are high frequency signals of a specified channel range in television broadcasting.

* * * * *